Figure 1:
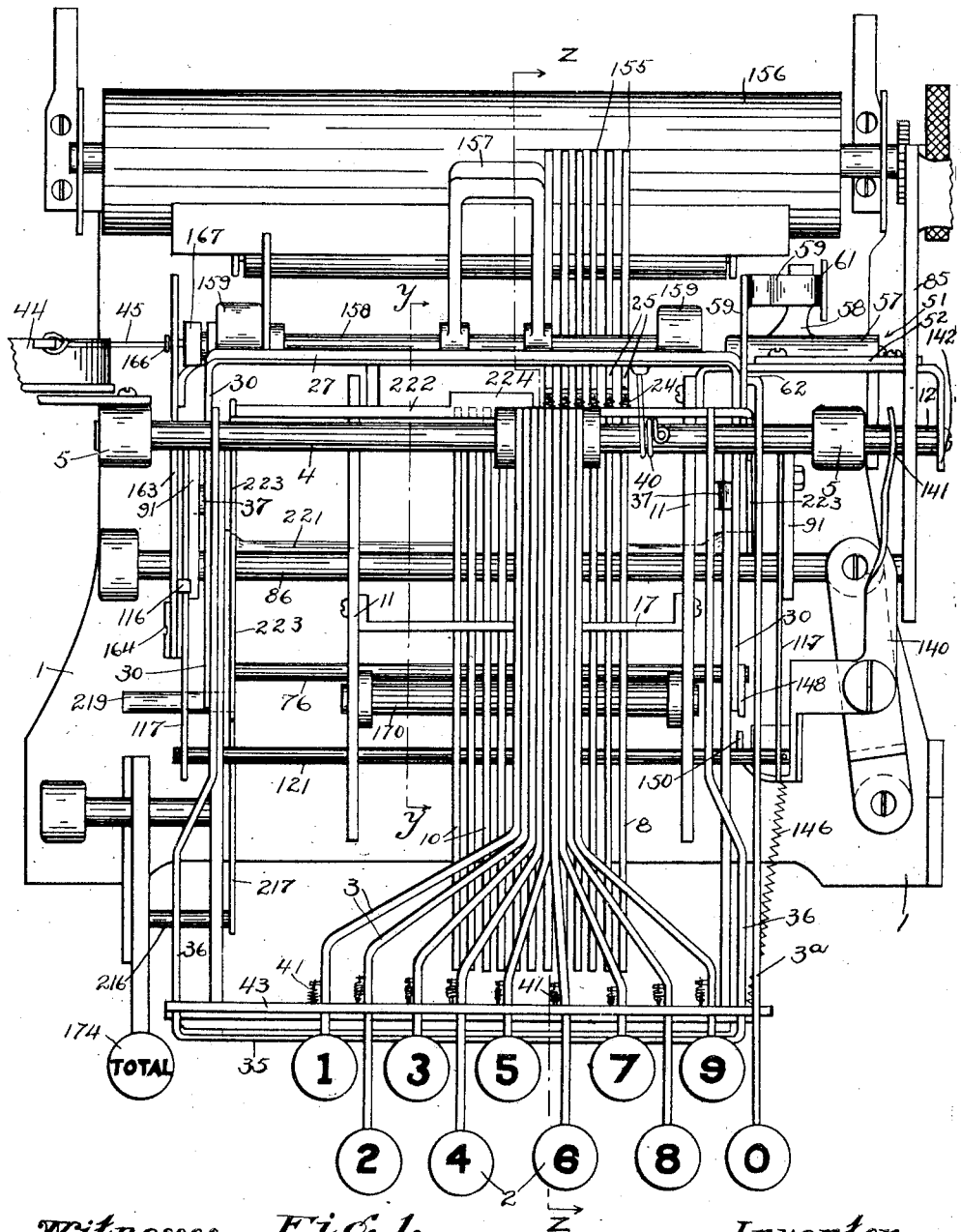

J. P. HARRISON, Jr.
ADDING MACHINE.
APPLICATION FILED JAN. 3, 1911.

1,063,348.

Patented June 3, 1913.

8 SHEETS—SHEET 3.

Witnesses
Lillian Burnett
Jacob A. Hollander

Inventor
John P. Harrison, Jr.,
by B. H. Herbst,
Attorney

J. P. HARRISON, Jr.
ADDING MACHINE.
APPLICATION FILED JAN. 3, 1911.

1,063,348.

Patented June 3, 1913.

8 SHEETS—SHEET 4.

Witnesses
Lillian Burnett
Jacob A. Hollander

Inventor
John P. Harrison, Jr.
by R. P. Herzberg
Attorney

J. P. HARRISON, Jr.
ADDING-MACHINE.
APPLICATION FILED JAN. 3, 1911.

1,063,348.

Patented June 3, 1913.

8 SHEETS—SHEET 5.

J. P. HARRISON, Jr.
ADDING MACHINE.
APPLICATION FILED JAN. 3, 1911.

1,063,348.

Patented June 3, 1913.

8 SHEETS—SHEET 6.

Witnesses
Lillian Burnett
Jacob A. Hollander

Inventor
John P. Harrison, Jr.
by R. A. Herbst
Attorney

J. P. HARRISON, Jr.
ADDING MACHINE.
APPLICATION FILED JAN. 3, 1911.

1,063,348.

Patented June 3, 1913.
8 SHEETS—SHEET 7.

Witnesses
Lillian Burnett
Jacob A. Hollander

Inventor
John P. Harrison, Jr.,
by A. P. Herbslet,
Attorney

J. P. HARRISON, Jr.
ADDING MACHINE.
APPLICATION FILED JAN. 3, 1911.

1,063,348.

Patented June 3, 1913.

8 SHEETS—SHEET 8.

Witnesses
Lillian Burnett
Jacob A. Hollander

Inventor
John P. Harrison, Jr.
by D. r. Hecker,
Attorney

UNITED STATES PATENT OFFICE.

JOHN P. HARRISON, JR., OF LUDLOW, KENTUCKY.

ADDING-MACHINE.

1,063,348.  Specification of Letters Patent.  Patented June 3, 1913.

Application filed January 3, 1911. Serial No. 600,513.

*To all whom it may concern:*

Be it known that I, JOHN P. HARRISON, Jr., a citizen of the United States, residing at Ludlow, in the county of Kenton and State of Kentucky, have invented certain new and useful Improvements in Adding-Machines, of which the following is a specification.

My invention relates to adding machines, particularly to the class of adding machines known as "ten-key" system machines.

My invention contemplates the provision of an adding machine employing a series of keys comprising digits, cipher to nine, and constructed so that the operation of the respective keys will cause lateral travel of a carriage having computing means thereon for arranging the computing means in lateral order in columns for forming numbers.

My invention further contemplates the provision of recording means arranged for having operative connection with the adding mechanism of the machine and embracing laterally movable bars, preferably in the form of computing bars, each of which has the digits arranged in sequence thereon, the adding mechanism being arranged to set the bars; and, further, the provision of totaling means.

My invention consists in novel means employed in effecting the results.

Figure 2:
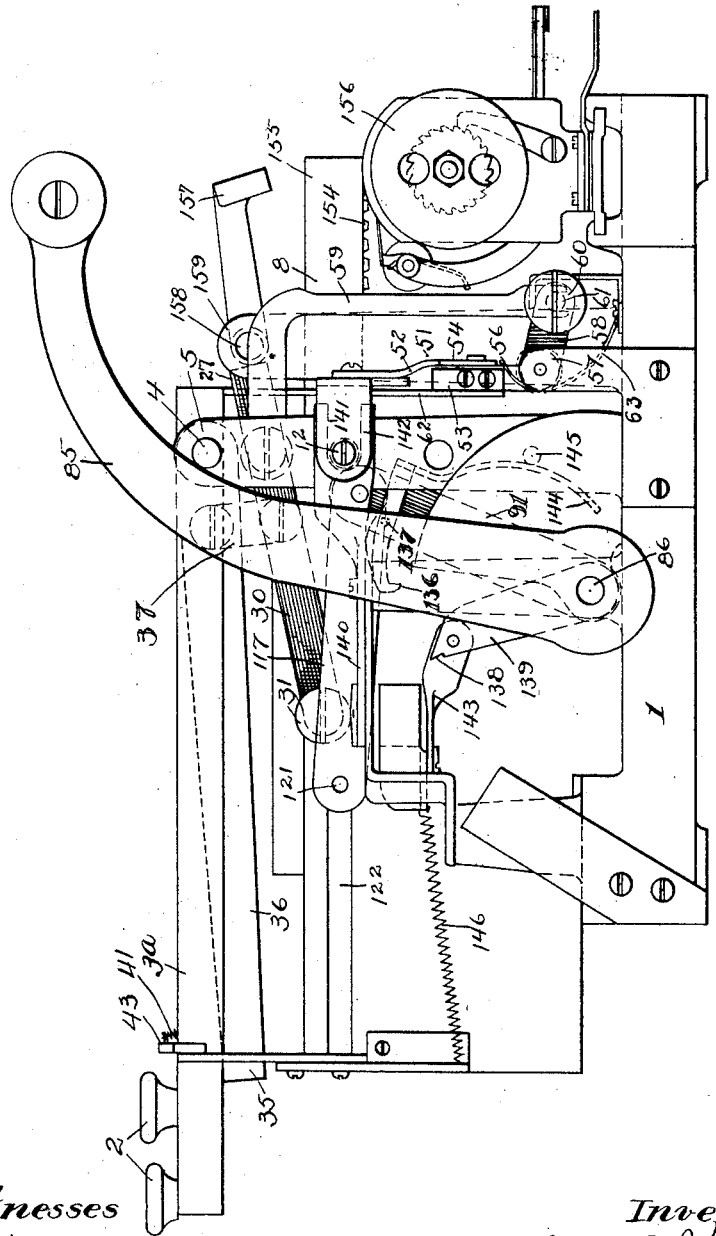
Figure 3:
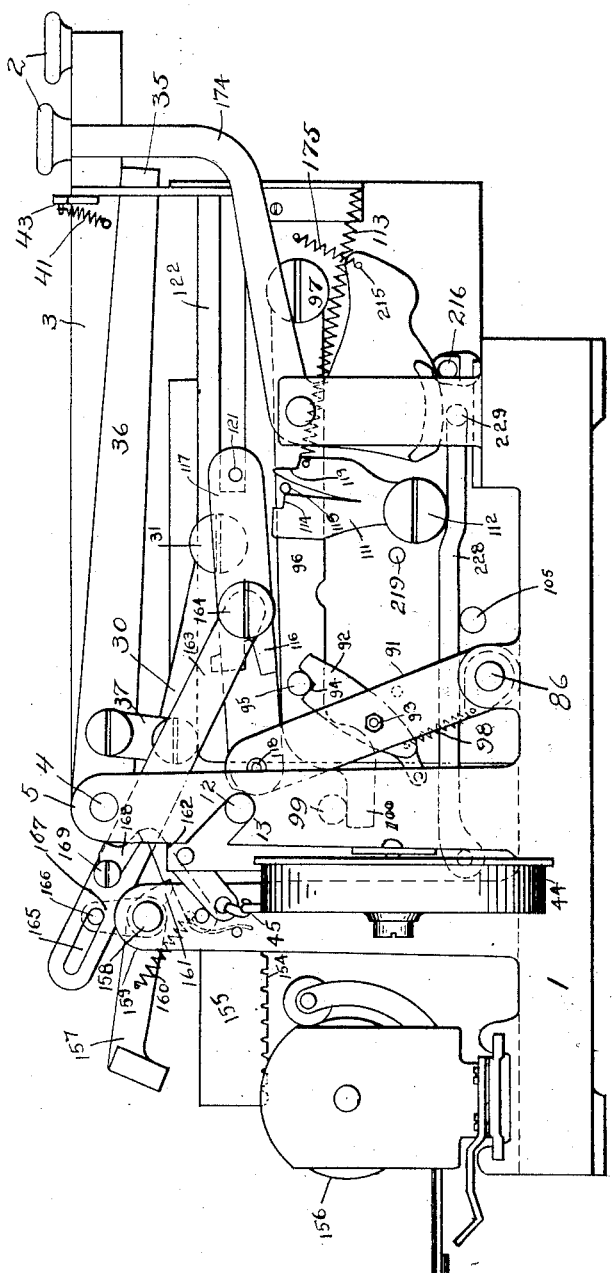
Figure 4:
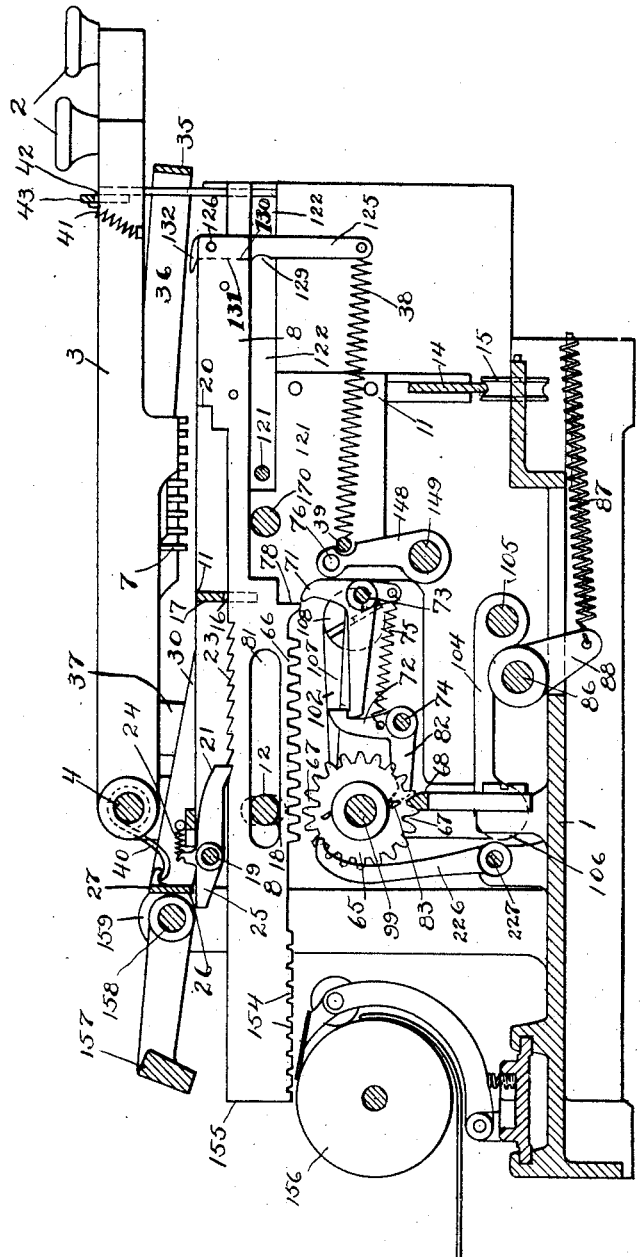
Figure 8:
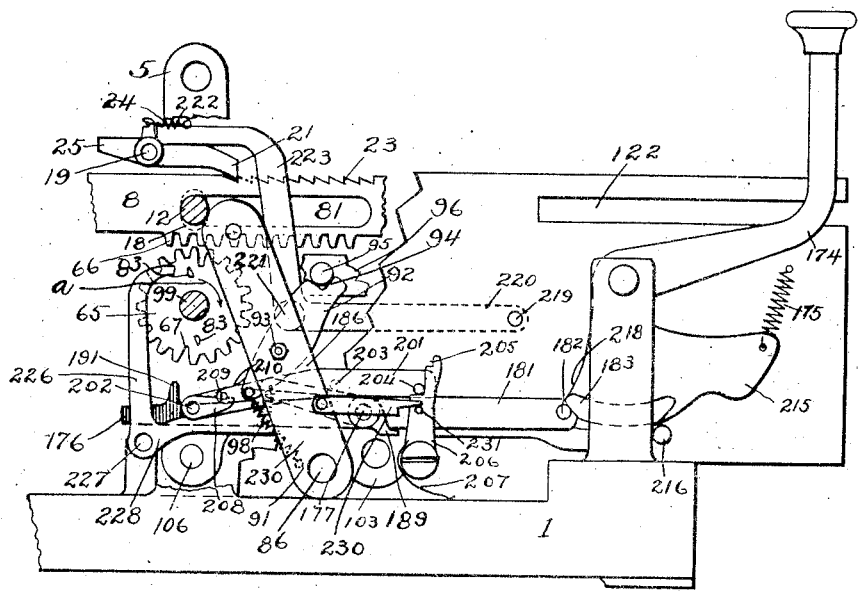
Figure 5:
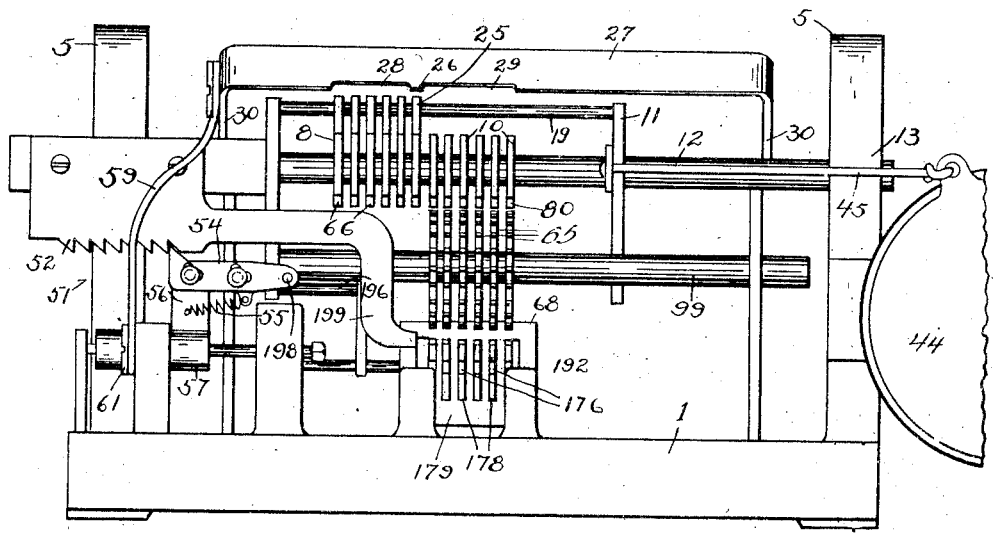
Figure 6:
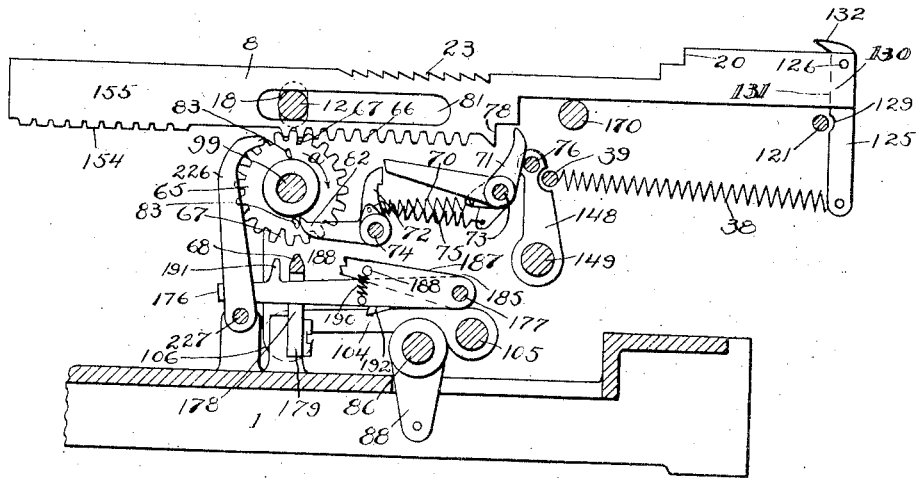
Figure 7:
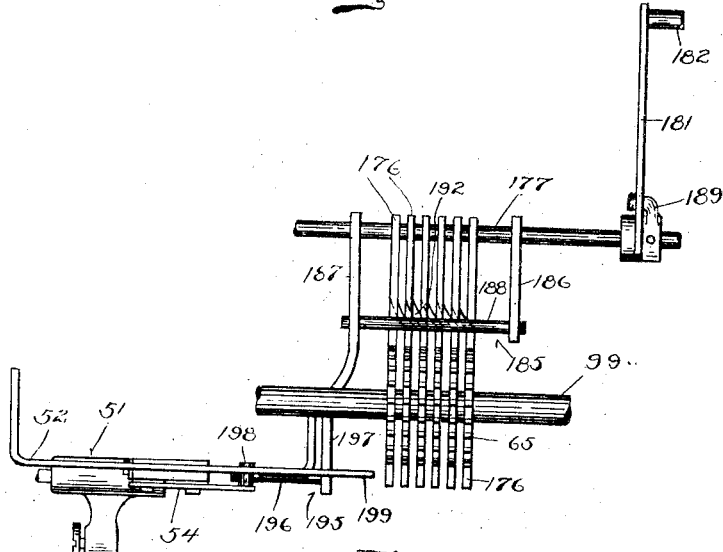
Figure 10:
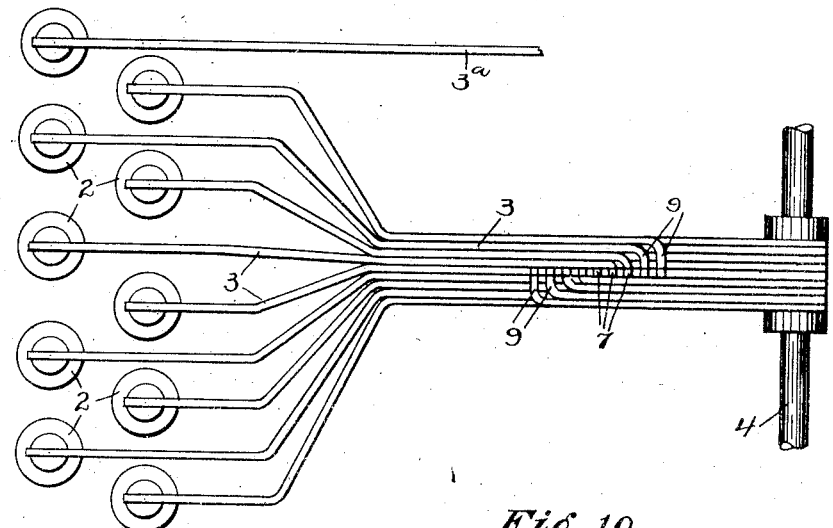
Figure 9:
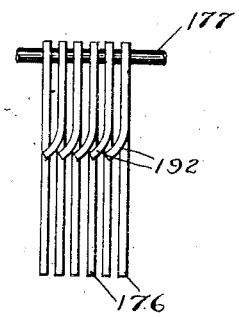
Figure 11:
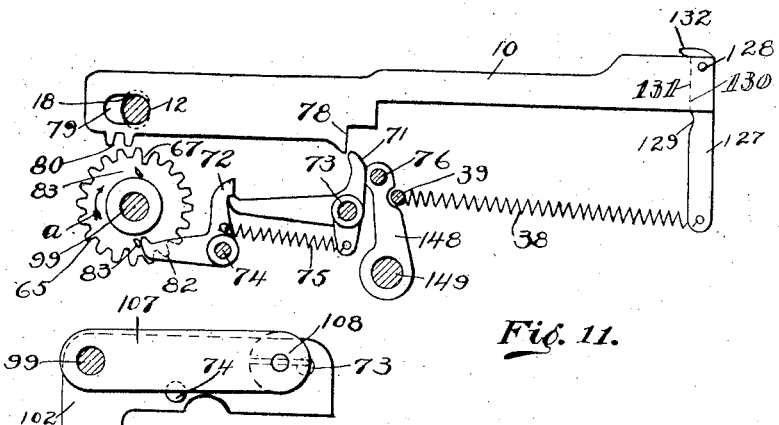
Figure 12:
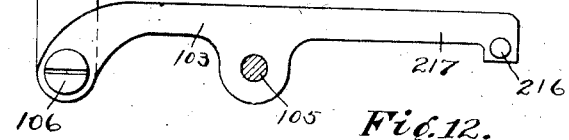
Figure 13:
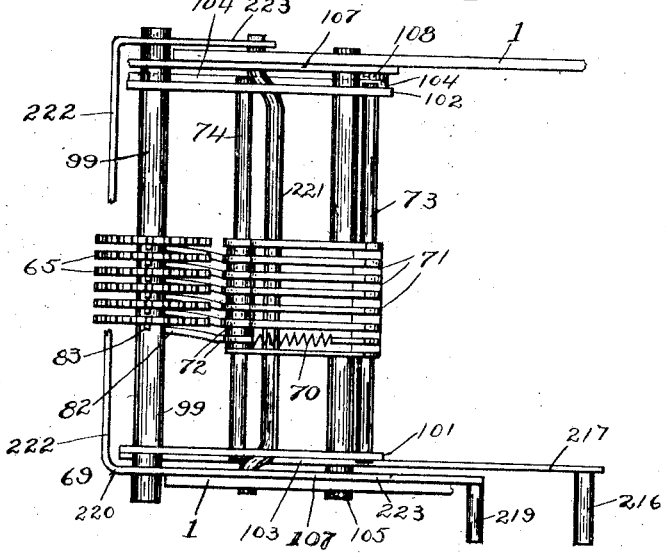

It consists further in providing longitudinally movable computing bars mounted in novel manner; further, in providing novel means for transferring the movement of the computing means to the accumulating mechanism; further in novel mechanism for causing operative engagement and disengagement between the accumulating wheels and computing mechanism; further, in novel carry-mechanism; further in novel extended-carry mechanism; further, in novel totaling mechanism; further, in novel total decimaling mechanism; further, in novel mechanism whereby operative engagement is maintained during predetermined periods between the accumulating wheels and computing mechanism; further, in providing means whereby when taking a total the means for causing operative engagement between the accumulating wheels and computing mechanism for accumulating, may be rendered inactive, and means for causing differently timed operative engagement between the accumulating wheels and computing mechanism to be rendered active; further, in novel lever mechanism; further in novel actuating means for recording resultants; and the invention will be further readily understood from the following description and claims, and from the drawings, in which latter:

Figure 1 is a plan view of my improved device, partly broken away. Fig. 2 is a right side elevation of the same. Fig. 3 is a left side elevation of the same. Fig. 4 is a cross-section of the same on the irregular line z—z of Fig. 1, with the carriage stopping mechanism removed, and with the accumulating wheels and bar-stops in lowered positions. Fig. 5 is a rear elevation of the same with the hammer mechanism and platen removed. Fig. 6 is a cross-section of the same on the line z—z of Fig. 1, showing the operative mechanism between the computing bars and accumulating wheels and the carriage stopping mechanism used in taking totals, the accumulating wheels and bar-stops being shown in raised positions. Fig. 7 is a plan view of the carriage stopping mechanism used in taking totals. Fig. 8 is a left hand elevation, partly broken away, showing the total-key mechanism. Fig. 9 is a bottom view of the carriage stops used in taking totals. Fig. 10 is a bottom view of the key-levers, partly broken away. Fig. 11 is a cross-section, taken on the line y—y of Fig. 1, illustrating the extended-carry mechanism. Fig. 12 is an end view of the therefor and the shaft for the accumulating wheels and bar-stops, the supporting shaft therefor and the shaft for the accumulating wheels being shown in cross-section; and, Fig. 13 is a plan view illustrating the carry mechanism between the accumulating wheels, and showing the equalizing mechanism for the accumulating wheels and bar-stops.

1 represents the main frame of the machine which may be of suitable construction. 2 are keys on which the digits from cipher to nine are respectively arranged. These keys are shown on levers 3 and 3ᵃ which are pivoted about a rod 4, the rod being shown mounted in bearings 5 of the main frame. Each of the levers 3 has a finger 7 thereon which is shown depending therefrom, (see Figs. 4 and 10), the fingers being arranged in a line one in front of the other and acting as stops for bars 8, the fingers being of a width and arranged in a line so as to affect only one of these bars at a time, and for the purpose some of the fingers may be on lateral projections 9 spaced from the levers under which said projections extend. There is a series of these bars, depending on the number of columns it is desired that the machine shall add or compute. I have shown the machine of a capacity of six columns and having six of the bars 8. I shall term these bars computing bars. The machine may also comprise a series of bars 10 which I shall term extended-carry bars, these latter having the purpose of extending the carry upon the accumulating-wheels hereinafter mentioned beyond the range of action of said computing bars upon said accumulating wheels. The bars are mounted on a carriage 11 which is movable laterally on suitable guideways on the main frame, shown in the present instance as a rod 12, at the rear of the carriage slidable longitudinally in bearings 13 of the main frame and a track 14 which rides upon a roller 15 suitably journaled in the main frame. The bars are shown spaced apart. The spacing of the bars is preferably accomplished by being received in slots 16 of a transverse plate 17, and by having the carriage-rod 12 provided with grooves 18 in which the bars are received.

The bars 8 are provided with shoulders 20, (see Figs. 4 and 6), arranged to respectively engage the finger on the key-lever 3 which may be depressed, for determining the longitudinal position of the bar upon the depressing of the key.

The bars 8 are normally locked in retracted positions by pawls 21, one of which is provided for each bar, the pawls being pivoted on the carriage on the pawl-rod 19, and normally held into engagement with the teeth of ratchet-racks 23, respectively on the respective bars 8, by means of springs 24. (See Figs. 4 and 8.) Each of the pawls is provided with a tail 25. These tails are successively acted upon, when brought by the lateral movement of the carriage under a trip 26, which is shown on a trip-bar 27 having clearance-spaces 28 29 at either side of the trip so as to avoid contact by the trip-bar with any of the pawls except the one which is momentarily located under the trip 26. (See Figs. 2, 4 and 5.) The trip-bar has forwardly extending arms 30, the forward ends of which are pivoted at 31 to the main frame.

35 is a universal bar received under the key-levers 3 and arranged to be moved by any of the latter. It has side-arms 36 which are pivoted to the main frame about the rod 4 upon which the key-levers are pivoted. The arms 36 and 30 are connected by links 37 for transferring the movement of each of the key-levers 3 through the medium of the equalizing bar to the trip-bar, irrespective of which key-lever 3 may be operated. Upon operation of a key-lever 3, the equalizing bar is depressed, which, through the medium of the links 37, depresses the trip-bar, the trip whereon depresses the tail of the pawl which may be thereunder, thereby raising the pawl and permitting the computing bar thereunder to be moved by means of a spring 38 until the shoulder 20 on the computing bar strikes the finger 7 of the key-lever 3 which has been depressed, thereby stopping the advance movement of the computing-bar, and locating the said bar in the proper position for computation in manner to be hereinafter described. Each of the bars 8 and 10 has a spring 38 applied thereto, one end of the springs being secured to a rod 39 in the frame 11. When the key-lever 3 is released, the pawl will first engage the tooth of the ratchet-rack on the computing bar which is in position for engagement, dependent on the location of the finger of the key-lever 3 which has been depressed, for longitudinally locating the computing bar for subsequent operation in a manner to be presently described. A spring 40 between the trip-bar and rod 4 normally retracts the trip-bar and universal bar. Springs 41 between the key-levers and frame normally retract the key-levers, the latter being operative in slots 42 of a plate 43 on the frame. Upon retraction of the key-lever, the carriage 11 is advanced laterally one space, under the influence of a spring barrel 44 which has a flexible connection 45 with the carriage 3 whereby the computing bar first acted on will be advanced to the column of next higher order. Upon each depression of any of the key-levers, the computing bar in the location of the last column reached in the number being formed on the machine will be acted on. This advance of the carriage is controlled by the escapement 51, (see Figs. 1, 2, 5 and 7,) shown consisting of a ratchet-rack 52 on the carriage and escapement pawls 53 54, of which 53 is a laterally rigid pawl and 54 is a laterally slidable pawl, retracted by the spring 55. The pawls are mounted on one arm 56 of a bell-crank rocker 57, the other arm 58 of which is operated by a link 59 articulated to the trip-bar, and having an end-slot 60 received over a pin 61 on the arm 58, the end-slot 60 being provided for permitting the escapement to be operated by the "cipher" key without operation of the trip-bar. The escapement is retracted to normal position by a spring 63. The normal longitudinal position of each of the computing bars is the "cipher" position, so that longitudinal movement of said bars is effected upon depression of the key-levers 3 only. The key-lever 3ª does not effect such longitudinal movement, but, like the key-levers 3, it effects lateral travel of the carriage, this being accomplished in the case of the lever 3ª by providing said lever with an arm 62 which contacts the rocker 57 for operating the same when the cipher-key is depressed. Assuming that it is desired to reduce the number 501, the "5" key is first depressed, which releases the first of the computing bars, and on retraction of the "5" key, the carriage will move one space to the left, bringing the next bar into range of the fingers 7. The "cipher" key being operated, leaves the computing bars longitudinally inactive, but shifts the carriage one more space. Operating the "1" key, acts on the third computing bar and the carriage is again shifted one space to the left. This places the computing bars and carriage in proper operative relation to the accumulating wheels and recording mechanism.

There is a series of accumulating wheels 65, shown as spur-wheels. (See Figs. 4, 5, 6, 8 and 13.) The computing bars are provided with toothed racks 66, which I shall term accumulating-racks, with which the accumulating wheels are arranged to mesh. Each of the accumulating wheels is shown as comprising a double series of ten teeth each, namely twenty teeth, there being a super-depression 67 in the respective wheels at the ends of the respective series of ten teeth. These accumulating wheels are arranged to rotate independently of each other, but are under the influence of the accumulating racks and of novel carrying mechanism to be presently described. The accumulating wheels are normally out of engagement with the accumulating racks of the computing bars and are normally locked in position by having a locking-bar 68 received in the depressions between the teeth of the accumulating wheels.

The carry mechanism comprises stops 71 in connection with which latches 72 are adapted to operate. There is preferably a stop in line with each accumulating wheel for acting on the bar in mesh with said wheel. The stops are pivoted about a rod 73 and the latches about a rod 74. The latches are normally held in engagement with the stops by springs 75 connected to said respective stops and latches, retracting movement of the stops being limited by the stop-rod 76. The stops limit the retraction of the computing bars and extended-carry bars. Each bar is provided with a contact-part 78 arranged to engage the stop. The stops arrest the bars at two predetermined points, one when the latch is in engagement with the stop, and an accumulation is taking place within the range of the accumulating wheel acted on, and the other when the latch is disengaged and there is a "carry" from an accumulating wheel of lower to one of higher order, resulting in a movement of one tooth in the wheel of higher order. The extended-carry bars are located above the accumulating wheels and stops, and the fingers 7 are located above the computing bar of ultimate highest order, during normal position of the carriage. When the carriage is moved one space to the left, all the bars 8 and 10 will be moved therewith, and the first or left-hand computing bar will be located above the last or right-hand accumulating wheel. The extended-carry bars serve the purpose of accumulating the "carries" into the accumulating wheels which are laterally to the left beyond the range of the computing bars. Thus assuming that only the first computing bar is in engagement with the last accumulating wheel, and the total added into the last five accumulating wheels is 99,999, and the amount to be added by the engagement just stated is "5", the operation of the operating lever will cause all of said extended-carry bars to act for accumulating the sum of 100,004 into said wheels. The extended carry-bars have but a limited movement, sufficient to effect the turning of an accumulating wheel one tooth. For this purpose the extended-carry bars are provided with short slots 79, through which the rod 12 extends, the end-walls of the slots limiting the longitudinal movements of the extended-carry bars. (See Fig. 11.) These bars also have short racks 80 with which the accumulating wheels are adapted to mesh. The computing bars have longer slots 81 in which the rod 12 is received to permit the greater range of movement required in said bars. The stops and latches are arranged to act in conjunction with the accumulating wheels for "carrying" from a wheel of lower order to a wheel of higher order. The latch for the stop of the first or column of lowest order is not however provided with releasing means, as in operation no "carry" is transferred to this wheel.

The latches 72 have tails 82 adapted to be engaged by pins 83 on the accumulating wheels respectively of next lower order. The tails 82, in the form shown, serve two purposes, one of which is to release the latch from the stop 71 when there is a "carry", at which time the accumulating wheel rotates in the direction of the arrow a, (see Figs. 6, 8 and 11,) and the other of which is to act as a stop for the accumulating wheel when taking a total, in manner to be hereinafter described, at which time the accumulating wheels rotate opposite to the direction of the arrow a, for arresting the rotation of the accumulating wheels at a point corresponding to zero, and thus "clearing" the machine. It will be noted, (see Fig. 13), that these tails project laterally from a latch in line with an accumulating wheel of higher order to an accumulating wheel of lower order, the accumulating wheel of lower order thereby effecting a carry into an accumulating wheel of higher order.

The tail for the accumulating wheel of highest order does not effect a carry, but acts as a stop for said accumulating wheel when taking a total. It is yieldingly held in obstructing relation to the pins 83 on said wheel by a spring 70, similar to the springs 75.

The stops 71 are normally out of range of the bars 8 and 10, and I prefer to bring the said stops and the accumulating wheels into range of said bars by a parallel movement which I accomplish in a novel manner.

Suitable operating means are provided, which, when manual operation is employed, may take the form of an operating lever 85 secured to an operating shaft 86 journaled in the main frame, normally held in retracted position by springs 87 between the main frame and arms 88 on the operating shaft. The operation of the operating lever, in its forward movement, causes engagement between the accumulating wheels and the accumulating racks, simultaneously bringing the stops 71 into range of the contact-parts therefor on the computing and extended-carry bars, and causes return to normal position of the computing bars and extended-carry bars, thereby transferring the result produced upon the bars by the key-levers to the accumulating wheels, and accumulating said result upon the total accumulation previously added into said wheels. Upon the retracting movement of the operating lever, the accumulating wheels, with the accumulations added into the same, are restored to normal positions and locked upon the locking bar, and the carriage is returned to normal lateral position, ready for the next operation of the key-levers in forming the next number. The mechanism by which these operations are accomplished will now be described.

For bringing the accumulating wheels into engagement with the accumulating racks and the stops into obstructing position, operating arms 91 are secured to the operating shaft. (See Fig. 3.)

92 is a toggle-link pivoted at 93 to one of the arms 91. It has a socket 94 in which a pin 95 on a lever 96 rests, the lever being pivoted to the main frame at 97. A spring 98 normally holds the wall of the socket against the pin 95.

The shaft 99 of the accumulating wheels is mounted upon an equalizing frame upon which the carrying stops 71 are also mounted. The lever 96 has a part 100 thereon which is arranged to engage the accumulating-wheel shaft for raising the same when the said lever is raised by the operating lever as stated. The equalizing frame preferably comprises bell-crank sides 101 102 connected by the rods 73 and 74. The bell-crank sides are preferably mounted about the accumulating-wheel shaft at the angle of the same.

103 104 are links secured at one end about a rock-shaft 105 journaled in the main frame and at their other ends are articulated at 106 to one of the arms of the respective bell-crank sides. (See Figs. 3, 12 and 13.) 107 are links pivoted at 108 to the machine frame at one end thereof, the other ends of said links being articulated about the accumulating wheel shaft. The links 103 104 and 107 are of equal length, and being respectively articulated to one of the arms of the bell-crank sides and the angle thereof, cause said equalizing frame to be raised in parallel lines upon elevation of the accumulating wheel shaft by the lever 96, thereby simultaneously bringing the accumulating wheels into range of the accumulating racks and the stops 71 into range of the computing and extended-carry bars.

It is desirable that the accumulating wheels shall be positively maintained in engagement with the accumulating racks until the completion of retraction of the computing bars, and for accomplishing this I provide an automatic latch 111 pivoted on a stud 112, and normally retracted by a spring 113. (See Fig. 3.) The latch has on it a keeping face 114 adapted to engage a pin 115 on the lever 96. When the operating lever is brought forward and the lever 96 raised, the keeping face 114 will find location under the pin 115 on the lever and maintain the accumulating wheels and equalizing frame together with the stops 71 in raised position throughout the forward movement of the operating lever and the movement of the bars 8 and 10 for accumulating upon the accumulating wheels. When this has been accomplished, and the operating lever is being retracted, a tappet 116 upon a link 117, articulated with one of the operating arms 91 at 118, engages a trip 119 on the latch 111 for retracting the latch out of range of the pin 115, which thereupon permits the lever 96 and the parts supported thereby to drop and again bring the accumulating wheels out of range of the accumulating racks and the stops 71 out of range of the enumerating bars. Each of the operating arms 91 is articulated with one of the links 117, between which links a locating rod 121 is mounted, the locating rod reciprocating in slots 122 of the main frame.

The computing bars have contact-arms 125 pivoted thereon at 126, and the extended-carry bars have contact-arms 127 pivoted thereon at 128. (See Figs. 4, 6 and 11.) Each of these contact-arms is provided with a notch 129 in which the locating rod 121 is adapted to be received. The springs 38 normally urge the contact-arms 125 into predetermined non-rigid relation with the bars 8 and 10, urging the rear faces 130 of said arms against the front end faces 131 of said bars. The contact-arms 125 are also provided with lips 132 adapted to engage the computing bars for limiting the movement of said contact-arms against the action of the springs 38, these lips being provided as a safeguard because of the range of movement of the enumerating bars. The object of the non-rigid mounting of the contact-arms is to provide means for effecting the carry from a column of lower order to a column of next higher order, during which the bar 8 or 10 effecting the carry has a longer than normal range of movement. When the locating-rod 121 is moved forward, it will be received against the contact-arms for returning the bars to normal positions, the range of movement of said contact-rod being equal to the greatest desired range of movement of the bars. When the stop 71 is in its normal or locked position the bar will be arrested in its normal position, the contact-arm 125 thereon, however, being swung on its pivot against the tension of the spring 38. If any stop 71 is released from its latch 72 the bar 8 or 10 corresponding thereto will continue its movement until it strikes its stop in its abnormal position, thereby moving the accumulating wheel in mesh with its rack the distance of one tooth and effecting a carry in that wheel.

It will be noted that upon depression of the key-levers the carriage is moved to the left. For returning the carriage to normal position upon retraction of the operating lever, I provide one of the operating arms 91 with a latch 136 pivoted thereto at 137, and adapted to engage a keeper 138 on an arm 139 pivoted about the operating shaft. (See Figs. 1 and 2.)

140 is a carriage-shifter in the form of a bell-crank lever having a fork 141 thereon received against a contact-part 142 of the carriage.

143 is a link articulated with the arm 139 and the carriage shifter for transferring the movement of the arm 139 when engaged by the latch 136, to the carriage-shifter 140, for returning the carriage to normal position, whereupon the latch is released from the keeper by having a tail 144 thereof strike a releasing-lug 145 on the main frame, a spring 146 returning the shifter to normal position.

Novel means are also provided for restoring the stops 71 into engagement with the latches 72, (see Figs. 1, 2, 4, 6 and 11,) and I prefer to accomplish this by mounting the stop-rod 76 in arms 148 secured to a rock-shaft 149 mounted in the main frame, the rod being arranged to engage the rear faces of the stops 71 and to be contacted by a contact-lug 150 on the carriage-shifter when said shifter is moved.

If it is desired to print the numbers resulting from the operation of the key-levers, the computing bars are each provided with type representing the digits from cipher to nine, as indicated by the knobs 154 on the extensions 155 of the computing bars (see Figs. 2, 3 and 4), the type being arranged to be respectively brought into range of a suitable platen, shown as a roller 156, arranged to be advanced or rotated in any suitable manner, not herein fully shown because well known. The type representing the cipher is normally in printing position above the platen. For imprinting the type upon a suitable paper or the like received about the platen, a hammer 157 is provided, it being understood that a suitable inking ribbon is also provided between the type and the paper, or other inking arrangement provided for the type. The hammer is secured to a rock-shaft 158 mounted in bearings 159 of the main frame and is normally under tension of a spring 160 for urging movement of the hammer toward the computing bars. (See Figs. 1 and 3.) The hammer is maintained in raised position by a catch 161 which is engaged by a latch 162.

163 is a link articulated with the link 117 at 164. The link 163 is guided by having a slot 165 in which a pin 166 is received on an arm 167 secured to the rock-shaft. During the beginning of the forward movement of the operating lever the link 163 is moved forwardly. The link 163 has thereon a trip 168 pivoted at 169 and normally in range with the latch 162. Upon forward movement of the link 163 the trip 168 disengages the latch 162 from the catch 161, whereupon the hammer is forced toward the rear extension of the computing bars with a sharp blow under the action of the spring 160 for impressing the type in line with the impressing part of the platen upon the paper or other transferring medium, the pin 166 during this movement moving in the slot 165, whereby sufficient play is given to the hammer and the rock-shaft to permit the hammer-blow. Upon further forward movement of the operating lever, however, the rear wall of the slot 165 engages the pin and again raises the hammer and swings the catch 161 into engagement with the latch 162, the latch being held in engaging position by the spring 160. Upon retraction of the operating lever the trip 168 is allowed to pass the latch 162 for being returned to tripping position. The positions assumed by the computing bars as heretofore explained for locating the same in proper relation to the accumulating wheels, dependent on the keys which have been depressed, also locates the computing bars longitudinally for determining the positions of the type thereon with relation to the platen, for imprinting the same numerals upon the transferring medium which have been transferred to the accumulating racks, in their proper sequence and proper columns. The type on the computing bars are normally slightly distanced from the platen so as to prevent blurring or streaks upon the transferring medium. The computing bars as already stated are supported on the carriage-rod 12 which is received through slots therein. They are also preferably supported at their forward ends upon a rod 170 secured between the sides of the carriage-frame. The forward ends of the computing bars are normally depressed by means of the springs 38. When now the rear ends of the computing bars are struck by the hammer, with a sharp blow as stated, these rear ends are momentarily depressed against the action of the springs 38, rocking upon the carriage-rod 12, and immediately after striking the transferring surface are retracted to normal position for leaving a clear sharp imprint.

The totaling mechanism of my improved device will now be described.

In taking a total, preferably the operative connection between the operating device or handle and the accumulating wheels is rendered inactive, the carriage is brought into proper lateral position for bringing those type-bars under the hammer which are arranged to act in conjunction with those accumulating wheels into which accumulations have been computed, the accumulating wheels are raised into mesh with the accumulating racks, the computing bars are released by the tripping of the pawls for transferring the accumulations in the accumulating wheels into the bars, whereby the accumulating wheels are also cleared by being returned to "zero," the pawls are brought into proper engagement with the proper rack-teeth, the total is recorded by the movement of the operating device or handle, and the parts are returned to normal positions.

174 is a total key, normally retracted by a spring 175, which is adapted to be depressed when it is desired to take a total. In the form shown, the carriage is first placed in lateral position so that the computing bars only of the height of order which have been accumulated, are brought within range of the hammer, so that the depiction of ciphers to the left of the total number may be avoided. I accomplish this by a series of carriage stops 176 in the form of bars normally out of range of the carriage, (see Figs. 5, 6, 7, 8 and 9,) pivoted about a rock-shaft 177 mounted in the frame, and movable in slots 178 of a plate 179 on which the stop-bar 68 is located.

181 is an arm loose about the rock-shaft and has a pin 182 thereon engaged by a cam 183 on the total-key 174.

185 is a rocker-frame comprising side-arms 186 187 secured to the rock-shaft and connected by a cross-rod 188. The rock-shaft is provided with a foot 189 received under the arm 181 for raising the rocker-frame. The carriage-stops are respectively connected with the rod 188 by springs 190 for urging upward movement of the stops when the rocker-frame is raised. The stops have thereon tongues 191 received between the teeth of the accumulating wheels. When any tongue 191, corresponding to the cipher-position of an accumulating wheel, is received in the super-depression 67, the stop-bar is raised into carriage-stopping position for arresting the carriage at that position, and preventing recording of ciphers to the left of the total accumulated in the wheels. It may occur, however, that there is a cipher between the end figures of the total or at the right of the total number. In order to prevent the carriage stopping prematurely, or before the whole of the total number is encompassed by the carriage-position, the carriage-stops are provided with laterally extending fingers 192. These fingers extend laterally above the carriage-stops corresponding to lower order-columns, so that if for instance a cipher appears to the right of any figure in the total, the laterally extending finger which is on the carriage-stop corresponding to said figure will maintain the cipher carriage-stop to the right thereof in lowered position, this lowered position corresponding to the height to which the tongue is permitted to rise when said tongue is received in the shallower depressions between the teeth of the accumulating wheels.

The release of the escapement dog 54 for permitting lateral positioning of the carriage is accomplished (see Figs. 5 and 7) by a trip 195, shown in the form of a stem 196 on an extension 197 of the arm 187, the stem engaging a pin 198 on said dog for raising the inner end of said dog and depressing the tooth end thereof out of engagement with the carriage-rack 52, a tail 199 on the rack making engagement with the first stop 176 moved into line therewith.

When taking a total it is desirable that the raising mechanism for the accumulating wheels and stops be brought out of influence of the action of the operating lever for the reason that, in the ordinary operation of the machine, the accumulating wheels are brought into mesh with the accumulating racks at the beginning of the stroke of the operating lever, for transferring the key-effects on the computing bars to the accumulating wheels, the computing bars being also returned to normal position during the forward movement of the operating lever. In taking a total however, the reverse of this operation takes place. The results in the accumulating wheels are transferred to the accumulating racks and computing bars for locating the computing bars at correct positions for placing the proper type above the platen for striking the proper total by means of the hammer. For accomplishing this an arm 201 is secured to a rock-shaft 202 in the frame. (See Figs. 6 and 8.) This arm has on it a pin 203 which is engaged by the arm 186, moved by the total key, for raising the arm 201 and bringing a pin 204 thereon upon a rest 205 of a latch 206 urged toward said pin 204 by a spring 207. The rock-shaft 202 has thereon a trip 208 adapted to engage a pin 209 on a tailpiece 210 of the toggle-link 92, thereby swinging said toggle-link out of range of the pin 95. The accumulating wheels are then raised, by the total-key into engagement with the accumulating racks, for which purpose (see Figs. 8 and 13), the total-key is provided with a cam 215 which engages a pin 216 on a forward extension 217 of the arm 103 of the accumulating wheel raising mechanism. As soon as the accumulating wheels have been raised into mesh with the accumulating racks, there is a portion 218 on the total key which strikes a pin 219 on a lever frame 220 having side arms 223 secured to a rod 221 rocking in the main frame, said lever-frame comprising a cross-bar 222 having a trip-part 224 thereon coinciding in lateral position to the hammer, the outer end of which strikes the pawls 21 only of those computing bars whose accumulating racks are in engagement with accumulating wheels upon which accumulations have taken place, releasing the pawls thus struck, and permitting the computing bars thus released to be forced rearwardly by the springs 38. This rearward movement is limited by having the pins 83 on said accumulating wheels strike the rear ends of the latches 82, for positioning the correct type on said bars in correct positions for printing, and resetting said accumulating wheels to zero.

As hereinbefore stated the movement of the computing bars and accumulating wheels, during accumulation upon the accumulating wheels, is in one direction, indicated by the arrow a, (see Figs. 6, 8 and 11,) while the movement of the computing bars and accumulating wheels in taking totals is in the opposite direction. In order to avoid detrimental effect by reason of any lost motion there may be between the parts when bringing the accumulating wheels back to zero in taking the total, I provide replacement fingers 226 for the accumulating wheels, (see Figs. 4, 6 and 8,) these replacement fingers being adapted to strike the pins 83 on the accumulating wheels momentarily prior to release of the accumulating wheels from the accumulating racks in taking a total, and preferably before the total is recorded. If for instance, by reason of lost motion, any pawl should locate upon the top of a tooth in taking a total instead of lodging against the rear face of said tooth, the momentary slight push given the accumulating wheel by the finger will replace the pawl in proper position against the rear face of the tooth. For operating said fingers I mount them on a rock-shaft 227 having an arm 228 secured thereto, the arm being provided with a pin 229 arranged to be engaged by the cam 215 on the total-key. The computing bars having now been placed in proper relation for recording the total, the total-key having been retracted by its spring, and the accumulating wheels thereby returned to normal position, the operating device or lever is operated for causing the hammer to strike its blow in recording the total and for returning the computing bars to normal positions. The forward movement of the operating arm 91 also causes a trip 230 thereon to engage a pin 231 on the latch 206 for releasing the latch and permitting the parts held thereby to be returned to normal positions. (See Fig. 8.) By this operation the machine has also been cleared, ready for fresh accumulations or calculations.

It is of course obvious that changes in construction or relations of elements or in sequence of operations may be made without departing from the spirit of my invention.

Having thus fully described my invention, what I claim as new and desire to secure by Letters Patent is:

1. In a machine of the character described, the combination of a series of longitudinally slidable and laterally movable computing bars, said parts movable in right lines and said respective movements being at right angles to each other, a series of key-operated parts, said key-operated parts and computing bars being provided with coacting selective stops, substantially as described.

2. In a machine of the character described, the combination of a series of longitudinally and laterally movable computing bars, said parts movable in right lines and said respective movements being at right angles to each other, key-operated parts, said key-operated parts and computing-bars having selective stops between them, and accumulating wheels, said accumulating wheels and computing-bars having operative connection between them for accumulating into said accumulating wheels the operative effect of said stops.

3. In a machine of the character described, the combination of longitudinally movable computing-bars, said parts movable in right lines and said respective movements being at right angles to each other, key-operated parts, said key-operated parts and computing-bars having selective stops between them for arresting said computing-bars at selective points for computing, ratchet and pawl mechanism for maintaining said computing-bars in arrested positions, and accumulating wheels having operative connection with said computing-bars for accumulating into said wheels the accumulating effect of the longitudinal movements of said computing-bars.

4. In a machine of the character described, the combination of longitudinally and laterally movable computing-bars, key-operated parts, said key-operated parts and computing-bars having selective stops between them, accumulating wheels having operative connection with said computing-bars for accumulating into said wheels the computing effect of said computing-bars, and extended carry-mechanism for said accumulating wheels having operative connection with said accumulating wheels upon lateral movement of said computing-bars.

5. In a machine of the character described, the combination of longitudinally movable computing-bars, means for selectively stopping the advance movements of said computing-bars, accumulating wheels, arresting means for the retractive movements of said computing-bars, and means for selectively bringing said accumulating wheels and arresting means into and out of range with relation to said computing-bars.

6. In a machine of the character described, the combination of longitudinally movable computing-bars, means for selectively stopping the advance movements of said computing-bars, accumulating wheels and retracting-stops for said computing bars, means for selectively bringing said accumulating wheels and retracting-stops into and out of range with relation to said computing-bars, and means for selectively positioning said retracting-stops for arresting the retractions of said computing-bars at selective points.

7. In a machine of the character described, the combination of longitudinally and laterally movable computing-bars, key-operated parts, said key-operated parts and computing-bars having selective stops therebetween, accumulating wheels, means for causing operative or inactive relation between said computing-bars and accumulating wheels, arresting stops for the return of said computing-bars, and latches for said last-named stops operated by said accumulating wheels.

8. In a machine of the character described, the combination of computing-bars, key-operated parts, said key-operated parts and computing-bars having selective stops therebetween for stopping the advance of said computing-bars at selective points, arresting means for arresting the retraction of said computing-bars, means for selectively positioning said arresting means, retracting means for said computing-bars, said retracting means having yielding connection with said computing-bars for retracting said computing-bars to said selective arresting positions.

9. In a machine of the character described, the combination of longitudinally and laterally movable computing-bars, key-operated parts, said key-operated parts and computing-bars having selective stops therebetween for selectively arresting the advance of said computing-bars, means for selectively arresting the retraction of said computing-bars, retracting means, and yielding parts on said computing-bars with which said retracting-means form operative connection for returning said computing-bars to predetermined positions.

10. In a machine of the character described, the combination of computing-bars, key-operated parts, said key-operated parts and computing-bars having selective stops therebetween for arresting the advance movements of said computing-bars, accumulating wheels, carry-mechanism for said accumulating-wheels comprising selectively positioned stops, and means for retracting said computing bars embracing a yielding part for retracting said computing-bars as determined by the positions of said last-named stops for selectively effecting carrying in said accumulating wheels.

11. In a machine of the character described, the combination of computing-bars, key-operated parts, said key-operated parts and computing-bars having selective stops between them, accumulating wheels and retracting stops, means for causing selective engagement between said computing-bars and said accumulating wheels and last-named stops, means for selectively positioning said last-named stops determined by the relations of positions of said accumulating wheels, retracting means for said computing-bars, and yielding bars for said computing-bars upon which said retracting means operate for causing selective retraction of said computing-bars against said last-named stops.

12. In a machine of the character described, the combination of longitudinally movable computing-bars, spring-actuated arms pivoted thereto, key-operated parts, said key-operated parts and computing-bars having selective stops therebetween for selectively arresting the advance of said computing-bars at predetermined points, arresting stops for the retraction of said computing-bars, means for selectively positioning said arresting stops in normal or abnormal positions, and means for retracting said computing-bars adapted to operate upon said spring-actuated arms for arresting said computing-bars in normal positions or permitting retracting movements of said computing-bars to abnormal positions dependent on the positions of said arresting stops.

13. In a machine of the character described, the combination of computing-bars, key-operated parts, said key-operated parts and computing-bars having selective stops therebetween, accumulating wheels arranged for having operative connection with said computing-bars, retracting stops for said computing-bars, triggers for said retracting stops operated by said accumulating wheels for releasing said retracting-stops and permitting abnormal retraction of said computing-bars for transferring a carry from an accumulating wheel of lower order to an accumulating wheel of higher order, retracting means for said computing-bars, and yielding means on said computing-bars with which said retracting means form operative connection for returning said computing-bars to predetermined positions, for the purpose described.

14. In a machine of the character described, the combination of computing-bars, means for selectively advancing said computing-bars, said computing-bars provided with racks, accumulating wheels, arresting stops for the retraction of said computing-bars, triggers for said stops having operative connection with said accumulating wheels for causing selective positioning of said arresting stops, and means for causing operative or inactive relation between said computing-bars and said accumulating wheels and arresting stops.

15. In a machine of the character described, the combination of longitudinally movable computing-bars provided with racks, equalizing mechanism, accumulating wheels and retracting-stops mounted on said equalizing mechanism, and means for moving said equalizing mechanism for causing operative or inactive relation between said accumulating wheels and racks and between said retracting stops and computing-bars, substantially as described.

16. In a machine of the character described, the combination of longitudinally movable computing-bars, equalizing mechanism, accumulating wheels and retracting-stops mounted on said equalizing mechanism, a locking part for said accumulating wheels, said racks and locking part being at opposite sides of said accumulating wheels, and means for rocking said equalizing mechanism for bringing said accumulating wheels alternately into operative or inactive relation with said racks and locking part, and bringing said retracting stops into operative or inactive relation with said computing-bars, substantially as described.

17. In a machine of the character described, the combination of computing-bars, contact-arms having yielding connection therewith, accumulating wheels, retracting-stops, triggers for said retracting-stops operated by said accumulating wheels for permitting said retracting stops to assume abnormal positions, an operating device of the machine, and a cross-bar having connection with the operating device of the machine arranged to engage said yielding contact-arms for permitting selective computing-bars to be retracted to abnormal positions permitted by the abnormal positions of said retracting stops, substantially as described.

18. In a machine of the character described, the combination of computing-bars and extended carry-bars arranged side by side, accumulating wheels, and means for causing relative lateral movement between said bars and accumulating wheels, for the purpose described.

19. In a machine of the character described, the combination of a series of computing-bars and a series of extended carry-bars arranged side by side, a series of accumulating wheels arranged side by side normally positioned for mating relation with said extended carry-bars, and means for causing relative lateral movement between said bars and wheels for causing said wheels to be relatively positioned for selectively mating with and extended carry-bars and with computing bars, for the purpose described.

20. In a machine of the character described, the combination of a series of computing-bars and a series of extended carry-bars located side by side, a series of accumulating wheels located side by side and normally positioned for mating relation with said extended carry-bars, and means for causing lateral movement between said bars and wheels for causing said series of wheels to be operatively arranged for mating relation with said series of extended carry-bars and with said series of computing-bars.

21. In a machine of the character described, the combination of longitudinally movable computing-bars having free ends provided with printing characters, a platen therefor, means for advancing said computing-bars, said computing-bars being yieldingly rockingly mounted for permitting movement of said computing-bars across their rocking axes, and a hammer for striking said computing-bars adjacent to said printing characters and causing rocking of said computing-bars, substantially as described.

22. In a machine of the character described, the combination of longitudinally slidable computing-bars, key-operated parts, said key-operated parts and computing-bars having selective stops therebetween for arresting the advance of said computing-bars at selective points, said computing-bars having racks and pawls therefor for maintaining said computing-bars in arrested positions, said computing-bars being yieldingly rockingly supported and movable across their rocking axes, said computing-bars provided with overhanging extensions having printing characters thereon, a platen, and a hammer arranged to strike said extensions for normally swinging said computing-bars on their rocking axes toward said platen.

23. In a machine of the character described, the combination of longitudinally movable computing-bars, key-operated parts, said key-operated parts and computing-bars having selective stops therebetween, said computing-bars being provided with ratchet-racks, pawls arranged to operate therewith for maintaining said computing-bars in assumed positions, said computing-bars having overhanging extensions provided with printing-characters, a platen for the latter, a hammer, said overhanging extensions received between said hammer and platen, and means for causing lateral movement of said computing-bars and thereby bringing selective extensions thereof within range of said hammer, substantially as described.

24. In a machine of the character described, the combination with a frame, of a carriage, linearly movable computing-bars mounted on said carriage, means for selectively advancing said computing-bars, said computing-bars being provided with ratchet-racks, pawls mounted on said carriage for the latter, a trip-bar with a pawl-operating part, key-operated means for operating said trip-bar, and means for causing lateral movement of said carriage for selectively bringing said pawls into range of said trip-bar, substantially as described.

25. In a machine of the character described, the combination with a frame, of a carriage, longitudinally movable computing-bars mounted on said carriage, means for selectively advancing said computing-bars, said computing-bars being provided with ratchet-racks, pawls mounted on said carriage for the latter, a trip, key-operated means for operating said trip-bar, said computing-bars having overhanging extensions provided with printing characters, a platen therefor, a hammer, and means for laterally moving said carriage for bringing selective ones of said extensions within range of said hammer and selective pawls within range of said trip, said overhanging extensions received between said hammer and platen, substantially as described.

26. In a machine of the character described, the combination of longitudinally movable computing-bars, key-operated parts, said key-operated parts and said computing-bars having selective stops therebetween, depending arms pivoted to said computing-bars, springs for the latter for normally urging advance of said computing-bars, accumulating wheels and retracting stops for said computing-bars, means operated by said accumulating wheels whereby said retracting-stops selectively assume abnormal positions, operating means for the machine, and a bar operated thereby for moving said arms and selectively retracting said computing-bars to normal positions, or beyond normal positions to abnormal positions, dependent on the normal or abnormal positions of said retracting-stops, substantially as described.

27. In a machine of the character described, the combination of computing-bars having racks thereon, accumulating wheels, means for causing operative advance of said computing-bars, an operating part, an arm having connection therewith, a raising device for moving said accumulating wheels into mesh with said racks and comprising a toggle-lever pivoted to said arm, a latch for maintaining said raising device in elevated position, and a trip for said latch for disengaging said latch on retraction of said operating device.

28. In a machine of the character described, the combination of a series of movable computing-bars, a series of accumulating wheels, supporting means for said wheels, an arm for elevating said supporting means, an operating device for said machine, an arm operated thereby, a toggle pivoted thereto, said toggle and second-named arm being the elevating means for said first-named arm, a latch for maintaining said first-named arm in elevated position, and a trip for said latch having connection with said second-named arm operable on retraction of said operating device.

29. In a machine of the character described, the combination of computing-bars provided with racks, accumulating wheels arranged for having operative or inactive relation with said racks, means comprising key-mechanism for causing advance of said computing-racks, an operating device for retracting said computing-bars to normal positions during operative engagement between said computing-bars and accumulating-wheels for adding the computations on said bars into said wheels, a total-key, means operated thereby for causing inactive relation between said operating means and computing-bars, zero-stops for said accumulating wheels, and means operated by said total-key for causing transference of the accumulations in said accumulating wheels to said computing-bars, means operated by said total-key for causing inactive relation between said accumulating wheels and computing-bars, and means for retracting said computing-bars to normal positions operated by said operating device.

30. In a machine of the character described, the combination of computing-bars, key-operated parts, said key-operated parts and computing-bars having selective stops therebetween, said computing-bars provided with ratchets and racks, pawls for said ratchets, a trip for said pawls operated by said key-operated parts, a series of accumulating wheels, and means causing operative or inactive relation between said wheels and racks comprising an elevating arm, an operating device for the machine, an arm operated thereby, a releasable connection between said arm and elevating arm for operating the latter, a total-key, means operated by said total-key for disengaging said releasable connection, and elevating means for said accumulating wheels operated by said total-key.

31. In a machine of the character described, the combination of computing-bars having printing characters thereon, a hammer therefor, retracting means for said computing-bars, a spring for urging said hammer toward said computing-bars, a catch for said hammer, a latch for said catch, a link having connection with said retracting means, a trip on said link for said latch arranged to trip said latch during the fore part of the movement of said retracting device for releasing said hammer, said link having spaced connection with said hammer for causing retraction of said hammer during the latter part of the retracting movement of said retracting device, substantially as described.

32. In a machine of the character described, the combination of a series of computing-bars arranged side by side, said computing-bars having overhanging extensions, a platen for the latter, a pivoted hammer for said extensions, an operating device for retracting said bars, a catch for said hammer, a latch for said catch, a link having connection with said operating device, a trip for said latch mounted on said link for releasing said latch during the fore part of the movement of said operating device, the said hammer and link having pin and slot connection therebetween for retracting said hammer and causing engagement between said catch and latch during the latter portion of the retracting movement of said operating device, substantially as described.

33. In a machine of the character described, the combination of longitudinally movable computing-bars, key-operated parts, said key-operated parts and computing-bars having selective stops therebetween non-rigid advancing parts on said computing-bars for normally urging advance thereof, a rock-shaft, an arm pivoted to said rock-shaft, a link having connection therewith, and a cross-bar arranged for operative engagement with said non-rigid advancing parts, retracting stops for said computing-bars, and means for permitting said retracting stops to assume abnormal positions, and constructed and arranged for arresting said computing-bars and retracting the same to normal positions or permitting the same to move to abnormal positions under the influence of said non-rigid connections, substantially as described.

34. In a machine of the character described, the combination of longitudinally movable computing-bars having overhanging extensions provided with printing characters, a platen for the latter, said computing-bars non-rigidly rockingly mounted and movable across their rocking axes, yieldable retracting-parts on said computing-bars, a rock-shaft, an arm thereon, a link articulated with said arm, a cross-bar for said link arranged for operative engagement with said yieldable retracting parts, a hammer for said overhanging extensions, a catch therefor, a latch for said catch, a link articulated with said last-named link and having a trip thereon for said latch, and raising means for raising said hammer and causing engagement between its catch and said latch, substantially as described.

35. In a machine of the character described, the combination of longitudinally movable computing-bars, accumulating wheels, retracting-stops for said computing-bars, latches for the latter operated by said accumulating wheels for permitting said retracting-stops to assume abnormal positions, an equalizing device upon which said accumulating wheels and stops are mounted, and arranged for moving said accumulating wheels and retracting stops into operative or inactive relation with said computing-bars, a trip for causing engagement between said retracting-stops and latches, and a rock-shaft, said last-named means operated by said rock-shaft.

36. In a machine of the character described, the combination with a frame, of a carriage, a series of computing-bars, and a series of extended-carry bars located side by side in said carriage, a series of accumulating wheels, key-operated parts for locating said computing-bars and in lateral relation for positioning said bars laterally with relation to said accumulating wheels, an operating device for the machine, said bars being provided with yielding contact-parts, retracting-stops for said bars arranged to be placed in abnormal positions under control of said accumulating wheels, and an engaging part for said yielding contact-parts operated by said operating device for retracting said accumulating bars in normal positions against said stops when in normal positions or for permitting movement of said computing-bars to abnormal positions permitted by abnormal positions of said stops.

37. In a machine of the character described, the combination with a total-key, of computing-bars located side by side, accumulating wheels located side by side, said computing-bars having ratchet-racks, pawls therefor, said accumulating wheels having zero-stops, and trips operated by said total-key arranged to act on said zero-stops for insuring proper operative relation between said pawls and ratchet-racks.

38. In a totaling mechanism in a machine of the character described, the combination with the frame, of a carriage mounted thereon, and accumulating wheels and stops for said carriage, said accumulating wheels and carriage-stops having parts therebetween for selectively controlling the positions of said stops.

39. In a machine of the character described, the combination of a series of laterally arranged linearly movable computing-bars, key-operated parts, said key-operated parts and computing-bars having selective stops therebetween arranged to act successively on said computing-bars from columns of higher to columns of lower order, and means for causing lateral travel of said computing-bars with a step by step movement for transferring said advanced computing-bar from a column of lower to a column of higher order on said accumulating wheels.

40. In a machine of the character described, the combination of a series of laterally arranged linearly movable computing-bars, key-operated parts, said key-operated parts and computing-bars having selective stops therebetween arranged to act successively on said computing-bars from columns of higher to columns of lower order, means for causing lateral travel of said computing-bars with a step-by-step movement for transferring said advanced computing-bar from a column of lower to a column of higher order on said accumulating wheels, and means for causing operative connection or inactive relation between said accumulating wheels and computing-bars.

41. In a machine of the character described, the combination of a series of linearly movable computing-bars arranged side by side, a series of accumulating wheels arranged side by side, said series of computing-bars and accumulating wheels being normally located in different transverse planes, means for causing lateral movement between said computing-bars and accumulating wheels for successively locating said accumulating wheels and computing-bars in transverse planes progressively from columns of lower to columns of higher order on said accumulating wheels with a step-by-step movement, and means for causing operative connection or inactive relation between said accumulating wheels and computing-bars, for the purpose described.

42. In a machine of the character described, the combination of movable computing-bars, accumulating wheels, and retracting-stops for said computing-bars arranged to move in the directions of movement of said computing-bars in effecting a carry in said accumulating wheels.

43. In a machine of the character described, the combination of a series of computing-bars, and a series of extended-carry bars arranged side by side, a series of accumulating wheels, means for causing relative lateral movement between said series of computing-bars and extended-carry bars and said accumulating wheels, and means for extending carry from said computing-bars to said extended carry-bars by means of the accumulating wheels.

44. In a machine of the character described, the combination of a series of computing-bars and a series of extended-carry bars arranged side by side, a series of accumulating wheels normally in operative relation with said extended-carry bars, means for causing lateral movement between said wheels and bars for causing operative relation between said accumulating wheels and adjacent computing-bars and extended-carry bars, key-operated parts for determining the accumulating positions of said computing-bars, and means for determining the retracting movement of said bars, substantially for the purpose described.

45. In a machine of the character described, the combination of a series of computing-bars and a series of extended-carry bars arranged side by side, a series of accumulating wheels normally in operative relation with said extended-carry bars, key-operated parts for determining the accumulating positions of said computing bars, means for causing lateral movement between said bars and wheels for causing said wheels to be operatively arranged between said series of computing-bars and extended-carry bars, and means for abnormal retraction of said extended-carry bars for causing carrying from columns of lower to columns of higher order in said accumulating wheels, substantially as described.

46. In a machine of the character described, the combination of a series of computing-bars, key-operated parts, said key-operated parts and computing-bars having stops therebetween, a series of extended-carry bars, a series of accumulating wheels, means for causing operative engagement between said wheels and bars of both said series of bars, means for abnormal retraction of a selective extended-carry bar determined by an accumulating wheel of lower order, and means for retracting said bars to selective normal or abnormal positions, substantially as described.

47. In a machine of the character described, the combination of a longitudinally movable computing-bar, a key-operated stop for arresting the advance of said computing-bar, a rack and pawl for locating said computing bar in its position of advance, an accumulating wheel arranged for operative engagement with said computing-bar, a spring-controlled retracting-bar pivoted to said computing-bar, a retracting-stop, means for positioning said retracting-stop, and operating means acting on said retracting-bar for retracting said computing-bar to an extent dependent on the position of said retracting-stop.

48. In a machine of the character described, the combination of a longitudinally movable computing-bar, a key-operated stop for arresting the advance of said computing-bar, a rack and pawl for locating said computing-bar in its position of advance, an accumulating wheel arranged for operative engagement with said computing-bar, a spring-controlled retracting-bar pivoted to said computing-bar, a retracting-stop, means for positioning said retracting stop, operating means acting on said retracting-bar for retracting said computing-bar to an extent dependent on the position of said retracting-stop, and a limiting stop between said retracting-bar and computing-bar.

49. In a machine of the character described, the combination of a longitudinally movable computing-bar, a rocking axis therefor, said computing-bar movable across its rocking axis, a key-operated stop for limiting advance movement of said bar, a rack and pawl for locating said bar in its position of advance, accumulating wheels, a retracting-stop for said computing-bar, said computing-bar having an accumulating rack thereon for one of said accumulating wheels, a trip for said last-named stop operated by an accumulating wheel whereby said stop assumes abnormal position, a spring-operated retracting-arm pivoted to said computing-bar, an operating device arranged for acting on said retracting-arm for retracting said computing-bar to selective extent determined by the position of said retracting-stop, and means for reëngaging said retracting-stop with said trip.

50. In totaling mechanism for a machine of the character described, the combination with a total-key, of computing-bars located side by side, accumulating wheels located side by side, locating means for said accumulating wheels having zero-stops, and trips for said zero-stops operated by said total-key and acting on said locating means for insuring zero-positioning of said accumulating wheels, substantially as described.

51. In totaling mechanism in a machine of the character described, the combination with a frame, of a movable carriage mounted thereon, accumulating wheels, and stops for said carriage controlled by said wheels.

52. In totaling mechanism in a machine of the character described, the combination with a frame, of a movable carriage mounted thereon, accumulating wheels, stops for said carriage, said accumulating wheels and carriage-stops having parts therebetween for selectively locating said stops in carriage-stopping positions, and operating means between stops of adajcent orders for causing intermediate stops between operated stops to be controlled.

53. In totaling mechanism in a machine of the character described, the combination with a frame, of a movable carriage mounted thereon, stops for said carriage, accumulating wheels, said stops provided with tongues and said accumulating wheels with depressions for receiving said tongues for locating said stops in carriage-obstructing positions.

54. In totaling mechanism in a machine of the character described, the combination with a frame, of a movable carriage mounted thereon, stops for said carriage, accumulating wheels, said stops provided with tongues and said accumulating wheels with depressions for receiving said tongues for locating said stops in carriage-obstructing positions, the stops of higher order having controlling means thereon for positioning the stops of lower order.

55. In totaling mechanism in a machine of the character described, the combination with a frame, of a carriage mounted thereon, accumulating wheels having teeth thereon, there being depressions between said teeth, a part of which correspond to zero-positions of said wheels and are super-depressions, stops for said carriage provided with tongues received in said depressions and brought into carriage obstructing positions when received in said super-depressions.

56. In totaling mechanism in a machine of the character described, the combination with a frame, a carriage mounted thereon, accumulating wheels having teeth thereon, there being depressions between said teeth, a part of which correspond to zero-positions of said wheels and are super-depressions, stops for said carriage provided with tongues received in said depressions and brought into carriage-obstructing positions when received in said super-depressions, said stops of higher order provided with controlling parts for controlling stops of lower order.

57. In totaling mechanism for a machine of the character described, the combination with a frame, of a carriage, accumulating wheels, a total-key, a rocker-frame operated by the latter, carriage-stops, springs between said rocker-frame and carriage-stops, said accumulating wheels and carriage-stops having locating means therebetween for determining the lateral position of said carriage.

58. In a machine of the character described, the combination of computing-bars, accumulating wheels in normally inactive relation therewith, key-means for operating said computing-bars, operating means for causing operative relation between said accumulating wheels and computing-bars and movement of said bars for accumulating their computing effect into said accumulating wheels, a total-key, means operated thereby rendering said first-named means inactive, means operated by said total-key causing operative relation between said accumulating wheels and computing-bars, and means operated by said total-key for causing transference of accumulating effect in said accumulating wheels to said computing-bars, and printing means for printing the total accumulated into said computing-bars actuated by said total-key, and operated in the order named, substantially as described.

59. In a totaling mechanism for a machine of the character described, the combination of computing-bars, accumulating wheels, operating means for causing accumulation of the computing-effect of said computing-bars into said accumulating-wheels, a carriage, carriage-stops, a total means operated by said total-key for controlling said carriage-stops and rendering said first-named means inactive and for causing operative engagement between said accumulating wheels and computing-bars prior to movement of the latter, for the purpose described.

60. In a machine of the character described, the combination of computing-bars, key-means for controlling movement of said bars, accumulating wheels, operating means for causing operative engagement between said accumulating wheels and computing-bars after said movement of the latter, a carriage, carriage-stops, a total-key, and means operated by said total-key for rendering said first-named operating means inactive and causing operative engagement between said accumulating wheels and computing-bars prior to movement of the latter, and means operated by said total-key for controlling movement of said computing-bars.

61. In a machine of the character described, the combination of computing-bars, accumulating wheels, and retracting stops, equalizing mechanism in which said wheels and stops are mounted, a carriage, carriage-stops, a total-key, means operated thereby for locating said carriage-stops and acting on said equalizing mechanism for causing operative engagement between said accumulating wheels and retracting stops and said computing-bars, for the purpose described.

62. In a machine of the character described, the combination of computing-bars, accumulating wheels, key-operated means for moving said computing-bars, operating means for causing operative engagement between said accumulating wheels and computing-bars after movement of the latter and return of said computing-bars to normal positions, carriage-stops, a total-key, and means operated by said total-key for rendering said first-named means inactive, positioning said carriage-stops, causing operative engagement between said accumulating wheels and computing-bars prior to movement of the latter, and controlling means for said last-named movement operated by said total-key, for the purpose described.

63. In a machine of the character described, the combination of accumulating wheels and key-operated parts for accumulating into said wheels, operating means for the latter, a carriage, a total-key, carriage-stopping mechanism operated by said total-key, means operated by said carriage-stopping mechanism for causing inactive relation in said operating means, means for causing operative relation between said accumulating wheels and first-named computing-bars, and tripping means for said computing-bars operated by said total-key for transferring the accumulations in said accumulating wheels to said computing-bars, substantially as described.

64. In a totaling mechanism in a machine of the character described, the combination of a laterally movable carriage, movable computing-bars mounted thereon, said computing-bars provided with ratchet-racks, pawls on said carriage arranged to engage said racks, carriage-stops, a rocker-frame therefor, a rock-shaft having an arm thereon operated by said rocker-frame, a trip thereon for rendering said first-named operating means inactive, a lever for operating said rocker-frame, a lever for tripping said pawls, and a total-key for operating said levers.

65. In a totaling mechanism in a machine of the character described, the combination of a laterally movable carriage, movable computing-bars mounted thereon, said computing-bars provided with ratchet-racks, pawls on said carriage arranged to engage said racks, carriage-stops, a rocker-frame therefor, a rock-shaft having an arm thereon operated by said rocker-frame, a trip thereon for rendering said first-named operating means inactive, a lever for operating said rocker-frame, a lever for tripping said pawls, a total-key for operating said levers, a latch for said lever on said rock-shaft, and means connected with said operating means for tripping said latch.

66. In a machine of the character described, the combination of a laterally movable carriage, computing-bars thereon having ratchet-racks, pawls for said racks, key-operated means for tripping said pawls and moving said computing-bars, accumulating wheels, operating means for causing operative engagement between said accumulating wheels and computing-bars and retraction of said computing-bars, comprising a toggle-lever, carriage-stops, a rocker-frame for the latter, a strip for said toggle-lever operated by said rocker-frame, pawl-actuating means, and a total-key for operating said rocker-frame and pawl-actuating means, substantially as described.

67. In a machine of the character described, the combination of computing-bars, key-operated means for moving the latter, accumulating wheels, retracting-stops for said bars, equalizing mechanism for causing operative or inactive relation between said accumulating wheels and retracting-stops with said bars, operating means having operative connection with said equalizing means, and arranged for retracting said computing-bars for transferring the accumulating effect of said computing-bars into said accumulating wheels, a total-key, means actuated thereby rendering said first-named operating means inactive and actuating said equalizing means for causing operative engagement between said accumulating wheels and computing-bars, and means operated by said total-key for releasing said computing-bars for transferring the accumulating effect of said accumulating wheels into said bars.

68. In a machine of the character described, the combination of computing-bars, accumulating wheels, a support therefor, operating means comprising a rocker-arm, a toggle-lever thereon for operating said support, a trip for said toggle-lever, a releasing-trip for said computing-bars, and a total-key for operating said trip for said toggle-lever and said trip for said computing-bar, substantially as described.

69. In a machine of the character described, the combination of computing means and accumulating wheels therefor, of operating means comprising a toggle-lever, carriage-stops, a rocker-frame for the latter, a rockable arm operated thereby, a trip for said toggle-lever operated by said rockable-arm, a trip for said computing means, and a total-lever for operating said rocker-frame and said trip in the order named, substantially as described.

70. In a totaling mechanism for a machine of the character described, the combination of computing-bars, locating means therefor for locating the said bars in retracted positions, accumulating wheels provided with contact-parts, locating-bars for said contact-parts for coincidently rotatively locating said accumulating wheels, a total-key, and means operated thereby for operating said locating-bars and locating said accumulating wheels and computing-bars.

71. In a machine of the character described, the combination of computing-bars, retracting parts therefor for retracting the same into retracted positions, accumulating wheels for said bars, said accumulating wheels having positioning-lugs, retracting-stops for said bars, trips therefor arranged to be operated by said positioning-lugs, a total-key, and means operated thereby having operative effect on said positioning lugs for locating said accumulating wheels and computing-bars.

72. In a machine of the character described, the combination of computing-bars, locating parts for locating said computing-bars in normal positions, accumulating wheels for said bars, said accumulating wheels having positioning-lugs, retracting-stops for said bars, trips therefor arranged to be operated by said positioning-lugs, a total-key, and means operated thereby having operative effect on said positioning-lugs for locating said accumulating wheels, computing-bars and locating means therefor in correct normal relations to each other, said lugs forming stops between said trips and accumulating wheels in taking totals.

73. In a machine of the character described, the combination of computing-bars, locating means therefor for locating said computing-bars in retracted positions, locating means for laterally locating said computing-bars in taking totals, accumulating wheels for said bars having positioning lugs thereon, a total-key, stops arranged to act on said positioning lugs for arresting said accumulating wheels at zero positions in taking totals, and means operated by said total-key having operative effect on said positioning-lugs for rotatively positioning said accumulating wheels in coincident relations, substantially as described.

74. In a machine of the character described, the combination of computing-means, accumulating wheels therefor, operating means comprising an operating part for returning said computing-means to normal positions, said accumulating wheels having positioning lugs thereon, arresting means therefor, means for causing disengaged relation in said operating means for rendering said operating part inactive, means for causing operative engagement between said accumulating wheels and computing-means for carrying totals, means for tripping said computing-means, and a total-key for operating said positioning means, disengaging means, carrying-means, and tripping means, substantially as described.

75. In a totaling mechanism in a machine of the character described, the combination of computing means, accumulating wheels, and operating means comprising a toggle-lever, of a total-key, a laterally movable carriage, a lever operated by said total-key, a rocker-frame operated by said lever, carriage-stops operated by said rocker-frame, a trip operated by said rocker-frame for rendering said toggle-lever inactive, a latch for said trip, and a trip for said latch having operative connection with said operating means.

76. In a totaling mechanism in a machine of the character described, the combination with a carriage, computing-means, accumulating wheels, and operating means for causing operative relation between said accumulating wheels and computing-means and retraction of said computing means and comprising a rockable arm and a toggle-lever thereon, a total-key, a lever operated by said total-key, a rocker-frame operated by said lever, carriage-stops having spring raising means connected with said rocker-frame, an arm, a trip operated by said arm for rendering said toggle-lever inactive, a latch for said arm, and a trip for said latch having connection with said rockable arm.

77. In a totaling mechanism in a machine of the character described, the combination with a carriage, computing-means, accumulating wheels, and operating means for causing operative relation between said accumulating wheels and computing-means and retraction of said computing means and comprising a rockable arm and a toggle-lever thereon, a total-key, a lever operated by said total-key, a rocker-frame operated by said lever, carriage-stops having spring raising means connected with said rocker-frame, an arm, a trip operated by said arm for rendering said toggle-lever inactive, a latch for said arm, a trip for said latch having connection with said rockable arm, and a trip for said computing-means operated by said total-key.

In testimony whereof, I have signed my name hereto in the presence of two subscribing witnesses.

JOHN P. HARRISON, Jr.

Witnesses:
  COLEMAN AVERY,
  LILLIAN BURNETT.